April 17, 1928.  1,666,545

M. WITT

SIGN FOR AUTOMOBILES

Filed Oct. 11, 1927    2 Sheets-Sheet 1

MURRAY WITT
INVENTOR.

ATTORNEYS.

April 17, 1928. 1,666,545
M. WITT
SIGN FOR AUTOMOBILES
Filed Oct. 11, 1927 2 Sheets-Sheet 2

MURRAY WITT
INVENTOR.

BY
ATTORNEYS.

Patented Apr. 17, 1928.

1,666,545

UNITED STATES PATENT OFFICE.

MURRAY WITT, OF BROOKLYN, NEW YORK, ASSIGNOR, BY MESNE ASSIGNMENTS, TO ATLAS MANUFACTURING CORPORATION, OF NEW YORK, N. Y., A CORPORATION OF NEW YORK.

SIGN FOR AUTOMOBILES.

Application filed October 11, 1927. Serial No. 225,565.

My invention relates particularly to lighted signs and signals for automobiles but can be untilized as well on other vehicles. It is particularly designed, in its present embodiment, to be attached to the radiator throat, below the cap, and consists primarily of a sign formed in the likeness of the present air cooled air plane, having lights and light openings in the front of the radiating cylinders, electric lighting means for controlling the lighting by the propeller, which is revolved by the air current produced by the motion of the vehicle.

In order that my invention and its various features may be fully understood, I shall first describe in detail the present mode in which I at present prefer to carry the invention into practice and then point out the invention in the claims.

Reference is to be had to the accompanying drawings forming part of this application in which like parts are designated by the same numbers in all the figures.

Figures 3 and 4 are detail views hereinafter referred to.

Figure 1:
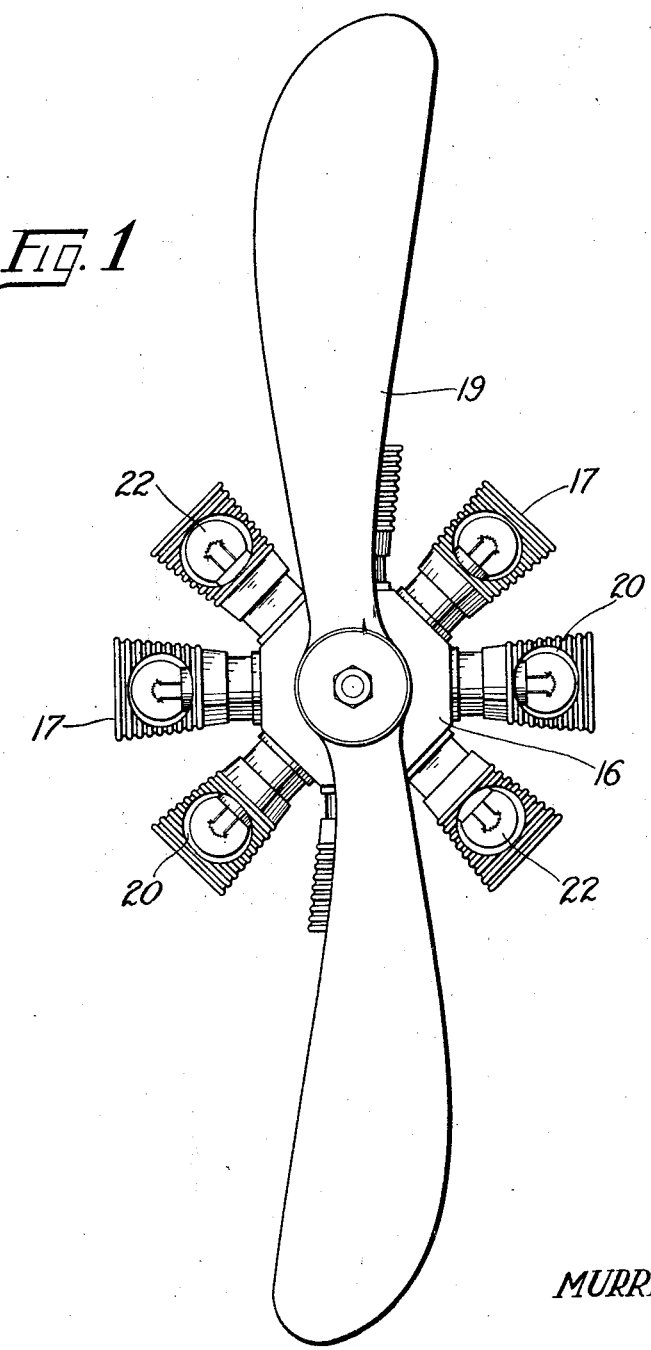
Figure 1 is a face view of a sign for automobiles embodying my invention.
Figure 2:
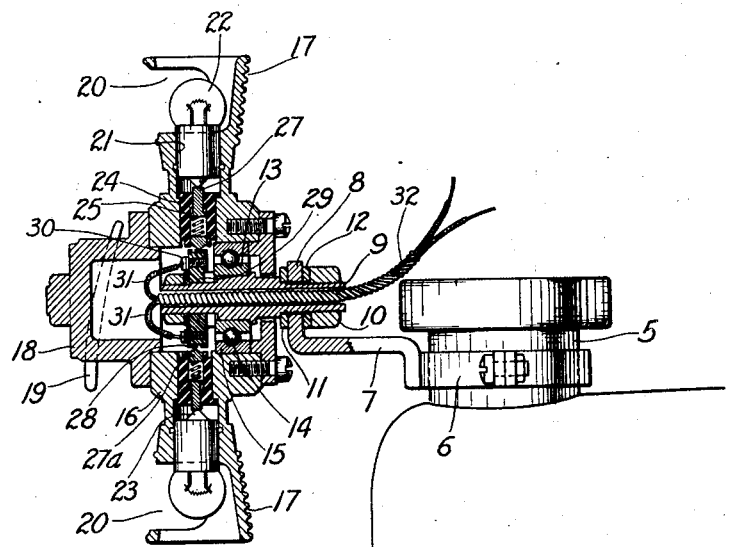
Figure 2 is a cross sectional view of the same.
Figure 3:
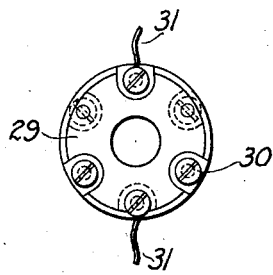
Figure 4:
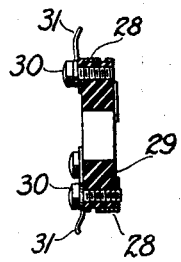

In the particular embodiment of my invention thus illustrated, which is intended for an automobile sign or signal, 5 designates the throat of the automobile radiator around which is clamped the split ring 6 of a bracket 7, which has an upturned arm 8, on which the sign or signal is fixed rigidly to the front of the radiator. Through an opening in the arm 8, is passed a bolt tube 9, which is threaded to receive a nut 10 with washers 11, 12, for detachably securing the tube to the arm. On the tube 9 is fixed the inner race ring 13 of a circular ball bearing 14, and on the outer revolving race ring 15 thereof is fixed a revoluble hub 16 formed with a series of, in this example, six radiating corrugated cylinders 17, in imitation of the radial cylinders of the ordinary air coiled air plane. On the front of the hub 16, is fixed a cap 18 on which is fixed a propeller 19 preferably in design like the propeller of an air plane in miniature.

With this construction, the propeller hub and cylinders will be easily revolved on the ball bearings by the air current produced by the forward motion of the vehicle.

In each cylinder 17, or in any particular number of them as may be desired, is formed a front light opening 20 of appropriate form, back of which is formed within the cylinder a radial lamp socket 21 grounded to the car frame to receive an electric lamp 22 having a positive contact 23 on its inner end.

Radially within each lamp socket 21 is formed in the cylinder a radial tube 24 to receive an insulating bushing 25 in the bore of which is fitted to slide axially a spring pressed metallic contact pin 27, the outer end of which touches the respective lamp contact 23. The inner contact ends of all the radial spring contact pins 27, revolve around while touching a circular series of contacts 28, fixed in and around the periphery of an insulating disk 29 which is in turn fixed on the tube 9.

In this insulating disk 29, are fixed binding screws 30, touching the respective disk contacts 28, from which binding screws lead the respective conductors 31 through a common cable 32 in the tube 9, to the current supply.

With this construction the lamps 22 will be lighted, as the lamp cylinders 17 are revolved by the attached propeller 19, in accordance with the arrangement of the automatic switches formed by the respective contacts on the radial lamp pins 27 and disk 29.

These automatic switches may be arranged, multiplied or varied to light the lamps in any desired order or number and the lamps may be colored to display different colored lights in any desired order or number.

The current supply conductors may also, in the case of a taxicab, be connected to the usual taximeter flag so as to display, for example, lights of one color to signal "vacant" and lights of another color to signal "occupied".

It is evident that many other changes may be made in the application, construction, arrangement or operation of my invention without departing from its boundaries as defined by the following claims.

I have applied for a patent on the particular design for the sign shown, in a separate application, executed and filed by me herewith.

I claim as my invention:

1. A sign for the purpose set forth, comprising a bracket and its means of attachment, a series of fixed cylinders radiating from the bracket and having light openings in their walls, lamps located within the cylinders behind the light openings and means for supplying electric current to all the lamps.

2. A sign for the purpose set forth, comprising a series of radial cylinders having electric lamps on the cylinders, and their current supply, a revoluble air propeller, electric switches controlling the lamps and means whereby the revoluble air propeller operates the switches and thus controls the lighting of the lamps.

3. A sign as specified in claim 2, in which the walls of the cylinders are formed with light openings, and the electric lamps are located within the cylinders behind the light openings.

4. A sign as specified in claim 2, in which the radial cylinders and propeller revolve together on a fixed bearing and the contacts of the controlling switches are respectively fixed to the bearing and to the revolving cylinders and propeller.

5. A sign as specified in claim 2, in which the radial cylinders and propeller revolve together on a tubular bearing, and the lamps are supplied by electric conductors leading through the tubular bearing to the respective switches.

6. A sign as specified in claim 2, in which the radial cylinders and propeller revolve together on a tubular bearing, the lamps are located within the cylinders, the lamp switches consist of axially sliding contact pins in and revolving with the respective cylinders and a fixed circular contact disk on the bearing, and the supply conductors lead through the tubular bearing to the respective contacts on the fixed contact disk.

In testimony whereof I affix my signature.

MURRAY WITT.